United States Patent [19]

Kamata

[11] 4,397,528
[45] Aug. 9, 1983

[54] ZOOM LENS ASSEMBLY WITH SINGLE OPERATIONAL MEMBER AND MEANS TO PROHIBIT DEFOCUSSING WHILE ZOOMING

[75] Inventor: Shigeru Kamata, Tokyo, Japan

[73] Assignee: Canon Kabushiki Kaisha, Tokyo, Japan

[21] Appl. No.: 283,894

[22] Filed: Jul. 16, 1981

[30] Foreign Application Priority Data

Jul. 21, 1980 [JP] Japan .......................... 55-102916[U]

[51] Int. Cl.³ .............................................. G02B 7/10
[52] U.S. Cl. .................................................. 350/429
[58] Field of Search ..................... 350/429, 430; 5/451

[56] References Cited

U.S. PATENT DOCUMENTS 3,277,783 10/1966 Eggert et al. ...................... 350/429
4,229,074 10/1980 Nonogaki ........................... 350/429
4,273,423 6/1981 Vesugi ............................... 350/429

*Primary Examiner*—Jon W. Henry
*Attorney, Agent, or Firm*—Toren, McGeady and Stanger

[57] ABSTRACT

In a lens assembly having a single operational member adapted to be manipulated to perform both focusing operation and zooming operation, there is provided a rotation preventing device for inhibiting rotation of the single operation member during axial movement thereof to perform zooming operation in order to prevent misalignment of a previously established focusing adjustment. The rotation preventing device includes a mechanism for establishing a frictional or spring-like force between the single operational member and a barrel member of the lens assembly in order to avoid relative rotation therebetween during zooming operation and the frictional force is initiated by a manually operable stopper member on the lens assembly.

9 Claims, 6 Drawing Figures

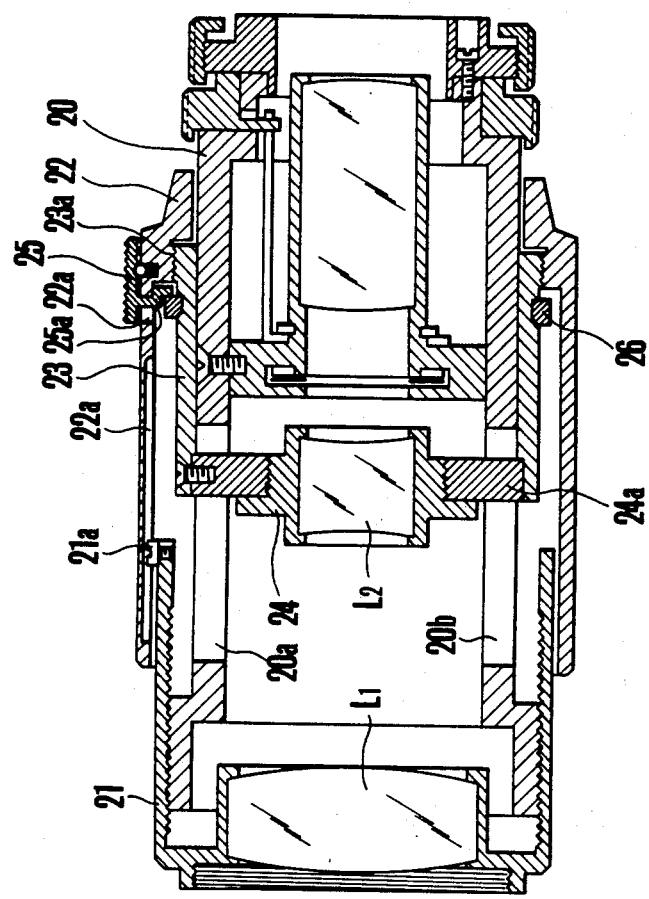

ZOOM LENS ASSEMBLY WITH SINGLE OPERATIONAL MEMBER AND MEANS TO PROHIBIT DEFOCUSSING WHILE ZOOMING

The present invention relates generally to optical mechanisms and more particularly to zoom lens assemblies.

In conventional zoom lens assemblies, it has been known to provide a distance adjusting or focusing ring and a zoom actuator ring separately, the two parts operating independently without relationship to each other. Both of these elements operate in a rotative manner to effect focusing and zooming.

In another prior art approach, the distance adjusting or focusing ring is combined with the zoom actuator or zoom ring in a single operational member which is capable upon rotation thereof of effecting a focusing or distance adjustment operation, with axial movement of the single operational member effecting zooming of the lens assembly.

In the case where the focusing and zooming member operate independently, accurate manipulation of the lens assembly is usually no problem, but quick management of such a lens assembly may cause difficulties. In cases where a single operational member is provided, although handling of the lens assembly may be quickly performed, draw-backs may arise during zooming since it often happens that the operational ring may be unintentionally rotated to misalign a previously established in-focus setting. Also, when focusing is being effected, it often happens that the operational ring will be unintentionally displaced in the direction of the optical axis thereby changing the magnification of the object.

Thus, in each of the aformentioned prior art arrangements, advantages and disadvantages will be found.

In addition to the previously described categories of zoom lens assemblies, other types which may be utilized will generally depend upon the type of operational optical lens groups which are utilized. A zoom lens generally comprises four lens groups with the inclusion of a focusing lens group operating in accordance with object distance. Additionally, a variator lens group is usually provided which contributes to change in image magnification and a compensator lens group contributes to compensation for shifting of the image caused by the aforementioned change in image magnification. In addition, a relay lens group is provided contributing mainly to formation of the image.

Of the four lens groups mentioned, the relay lens group may be omitted in some of the designs of optical lens systems.

In zoom lenses, the method usually utilized for moving the focusing and zoom lens groups are performed by elements which are comprised in two forms, one of which is called mechanical compensation. While the variator lens group is moved to change image magnification, the compensator lens group is moved to adjust aberrations in response to the change in image magnification as the variator lens group and the compensator lens group follow their respective tracks. The mechanical compensation type of zoom lens requires use of a cam ring having specific cam grooves for imparting different concurrent movements to the two moveable lens groups and therefore the mechanical mounting for the zoom lens assembly tends to be rather complicated.

Another type of mechanism is known as the optical compensation type zoom lens in which all the moveable lens groups are moved in unison to perform magnification varying functions and the compensating function. The mounting mechanism for this type of zoom lens is simplified in structure, but it is difficult to accurately adjust aberrations in response to change in the image magnification and improvement of the precision of the optical compensation is difficult to achieve.

In the optical compensation type of zoom lens assembly which employs a single operational member for performing both focusing and zooming functions, it has been known to provide a mechanism for inhibiting actuation of the focusing control mechanical part of the operation member and such a device is known, for example, in U.S. Pat. No. 3,277,783.

In the device disclosed in this patent, focusing operation is performed by rotation of a single operational member and zooming operation is performed by linear movement of the operational member with the focusing lens group being inhibited from movement by rotative operation of a locking ring. In this type of device an advantage arises in that during the zooming operation by linear movement of the single operational member, occurrence of a defocusing accident by rotation of the same operational member can be avoided.

The present invention is intended to provide a zoom lens assembly of the mechanical compensation type utilizing a single operational member whereby it may be possible to perform both focusing or distance adjustment and zooming operation without loosing a sharp focus by unintentional movement of the parts during zooming operation.

Usually, in conventional zoom lens assemblies, when the optical device is pointed upwardly or downwardly during film exposure moveable parts of the lens optical system are permitted to become displaced within the mounting units due to the action of gravity thereby causing accidental varying of the focal length of the entire system.

It is therefore a further aim of the invention to provide a lens assembly which, after it has been sharply focused, will not undergo deviation of the sharp focus even when the camera or the lens assembly are held in either an upwardly pointed or downwardly pointed position for exposure of the film.

SUMMARY OF THE INVENTION

Briefly, the present invention may be described as a zoom lens assembly wherein a single operational member may be operated to effect both focusing and zooming operation of the lens assembly. Focusing operation is accomplished when the single operational member is rotated about the optical axis of the lens assembly and in order to effect zooming operation the operational member is moved along the optical axis of the assembly.

The present invention is particularly directed toward clutch means whereby the single operational member is prevented from being rotated relative to another component of the lens system during zooming operation in order thereby to avoid changes in a focus setting previously established when zooming operation is to take place.

The clutch means of the present invention operate to apply a spring force or a frictional force on the single operational member during zooming operations and the features of the present invention are applicable to a wide range of lens assemblies of different focal lengths, F-numbers and the like.

The various features of novelty which characterize the inventions are pointed out with particularity in the claims annexed to and forming a part of this disclosure. For a better understanding of these inventions, their operating advantages, and specific objects attained by their use, reference should be had to the accompanying drawings and descriptive matter in which there is illustrated and described a preferred embodiment of the inventions.

DESCRIPTION OF THE DRAWINGS

FIG. 4 is a longitudinal sectional view showing an example of a modification of a lens assembly of the type shown in FIG. 1.

DETAILED DESCRIPTION OF THE PREFERRED EMBODIMENT

Figure 1:
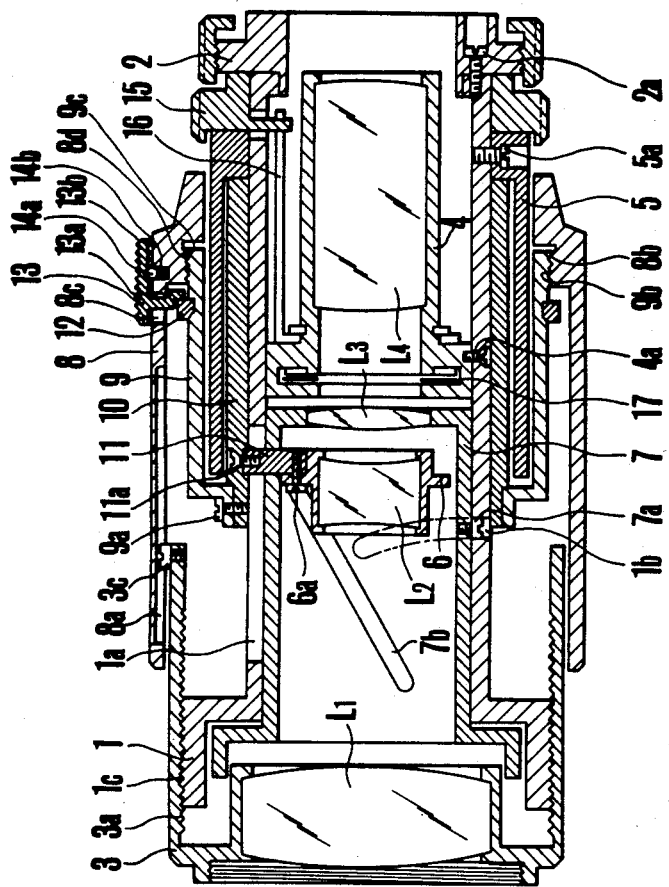
FIG. 1 is a longitudinal sectional view of one embodiment of a lens assembly in accordance with the present invention.

Referring now to the drawings, wherein similar parts are identified with like reference numerals throughout the various figures thereof, and particularly to FIG. 1, there is shown an embodiment of the present invention as applied to an interchangeable lens assembly for a single lens reflex camera. In the embodiment shown in FIG. 1 the optical system of the lens assembly comprises a focusing lens group L1 for adjustment related to the object distance, a variator or moveable lens group L2, a compensator or moveable lens group L3, and a stationary relay lens group L4. A fixed lens barrel 1 of the lens assembly has at one end thereof a mount member 2 provided with coupling means for attachment of the lens assembly to a camera body (not shown) by means of fastener devices such as screw threads 2a or the like.

The lens barrel 1 has formed therein an axially elongated linear slot 1a and an arcuate slot 1b controlling axial movement of the compensator lens group L3. At the opposite end of the lens barrel 1 there is shown a holding member 3 for supporting the focusing lens group L1, the member 3 being engaged with the barrel 1 by respective helicoid thread portions 1c and 3a.

A fastener screw 4a is provided for affixing a holding member 4 for the relay lens group L4 to the fixed lens barrel 1. A scale barrel 5 is affixed to the barrel 1 by screws 5a and is formed with a scale thereon.

On the interior of the lens barrel 1 there are arranged lens holding members 6 and 7 for the variator lens group L2 and the the compensator lens group L3 to be axially moveable.

The lens assembly of FIG. 1 is provided with an operational member 8 fitted through an intermediate barrel 9 and a zoom barrel 10 to the fixed barrel 1 so that straight axial movement along the optical axis and rotative operation about the optical axis may be performed. The intermediate barrel 9 is fixed to the zoom barrel 10 by screws 9a and a screw-threaded portion 9b provided at its end meshes with a screw-threaded portion 8b of the operational member 8 thereby making the operational member 8 rotatable relative to the intermediate barrel 9.

The intermediate barrel 9 and the zoom barrel 10 form an intermediate member which lies between the barrel 1 and the operational member 8 in order to make it possible to perform change-over from rotational operation to axial operation. That is, the intermediate barrel 9 and the operational member 8 are engaged with each other by the screw-threaded portions 8b, 9b having a fine pitch so that when the operational member is rotated it will be moved only in a direction along the optical axis whereby when the member 8 is moved linearly along the axis the intermediate member 9 will also be moved axially along therewith.

The operational member 8 has an axial advancing groove 8a extending along the optical axis on an inner portion thereof in which there is engaged a pin 3c which is located on a sleeve portion extending from the holding member 3 toward the camera side so that when the operational member is rotated the holding member 3 is also rotated about the optical axis causing the focusing lens group L1 to be moved axially by operation of the aforementioned helicoid threads 1c and 3a thereby enabling control of the object distance adjustment.

The holding member 7 for the compensator lens group L3 is fitted in the inner diameter of the fixed barrel 1 and a pin 7a mounted on the outer periphery thereof engages in the arcuate slot 1b of the barrel 1 so that its axial movement will be controlled by the slot 1b. A member 11 of the holding member 6 of the variator lens group L2 has one end thereof extending through an inclined slot 7b formed in the lens holding member 7 and through the linear slot 1a of the fixed barrel 1. The member 11 is fixed to the zoom barrel 10 by screw fasteners 11a and the opposite end thereof is fixed by screw fasteners 6a to the holding member 6 of the variator lens group L2.

The lens assembly of the present invention is provided with a brake ring 12 which comprises an annular elastic member fitted in a circumferential groove 9c provided on the outer periphery of the intermediate barrel 9 and having a slanted portion or tapered surface 9c'. A stopper member 13 is fitted on the outer diameter of the operational member 8 and includes a leg portion 13a which extends through an axial slot 8c in the operational member 8 toward the interior of the barrel 1 where the leg portion 13a is in contact with the elastic brake ring 12. The stopper member 13 is arranged so that upon forward movement thereof on the outer periphery of the operational member 8 it will press an inclined portion 12a of the brake ring 12 against an upper part 9d of the tapered surface 9c' of the groove 9c in the intermediate barrel 9.

The stopper member 13 is controlled by a click mechanism which includes a click ball 14a fitted in a recess portion of the operational member 8 together with a biased spring 14b. The ball 14a is adapted to engage in click detent grooves 13b provided on the surface of the stopper member 13 with the spring 14b urging the ball 14a into engagement with the grooves 13b.

The lens assembly includes a diaphragm setting member 15 fitted on the lens barrel 1 and transmitting a set diaphragm aperture signal through a signal transmitting member 16 to a diaphragm unit 17 which is of conventional construction. The diaphragm mechanism may be arranged in a conventional manner and accordingly no detailed explanation thereof is considered necessary.

In FIG. 1, there is shown an arrangement of the various constituent elements of the lens assembly in a position where the operational member 8 is set for the longest focal length. When the operational member 8 is moved from the position of FIG. 1 in an axial direction, the intermediate barrel 9 and the zoom barrel 10 will be axially moved in unison therewith whereby the variator or moveable lens group L2, by virtue of being fixed through the holding member 11 with the zoom barrel 10 will also be axially moved.

When the holding member 11 is axially displaced by the linear slot 1a provided in the barrel 1, the holding member 7 of the compensator lens group L3 will have imparted thereto rotative movement by engagement of the inclined groove or slot 7b with the holding member 11. At the same time axial displacement along the arcuate slot 1b is controlled by engagement of the pin 7a in the arcuate slot 1b whereby the compensating function will be performed along with the magnification change function of the lens group L2.

When the operational member 8 is axially displaced, the variator lens group L2 is axially displaced in unison therewith and the compensator lens group L3 is axially displaced in response to the amount of displacement of the arcuate slot 1b. When zooming operation is being performed by this axial movement of the operational member 8, the focusing lens group L1 and the relay lens group L4 remain stationary.

When it is desired to adjust for object distance to focus the lens assembly, the operational member 8 is rotated about the optical axis whereby rotative force is transmitted through the linear groove 8a to the pin 3c and therefrom through the connection of the helicoids 3a and 1c of the holding member 3 and the fixed barrel 1 in order to axially move the focusing lens group L1.

Figure 2A:
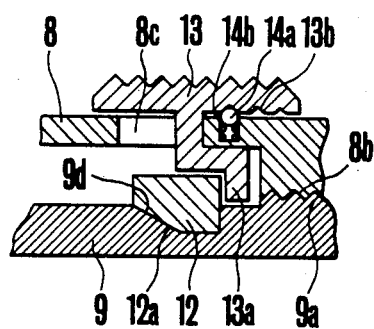
FIGS. 2(a) and 2(b) are fragmentary sectional views showing in greater detail parts of the assembly of FIG. 1.
Figure 2B:
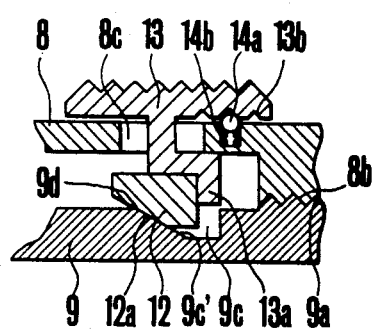

After the zoom lens has been sharply focused to an object position, the operator may slide the stopper member 13 axially from the position shown in FIG. 2a to the position shown in FIG. 2b whereby the leg portion 13a will be pressed against the elastic brake ring 12 which will be in turn pressed against the tapered surface 9c' of the intermediate barrel 9 thereby inhibiting rotation of the operational member 8 relative to the intermediate barrel 9 through the connection of the helicoids 8b and 9b. Therefore, the operational member 8 may be freely moved along the optical axis in order to effect zooming operation while the in-focus condition of the lens is securely maintained.

The manner in which this mode of operation occurs is best seen by reference to FIG. 2a which shows that with the lens components in the condition depicted therein, the leg portion 13a of the stopper member 13 will not apply pressure on the brake ring 12 and as a result the operational member 8 will be freely rotatable relative to the intermediate barrel 9 through the threaded connection shown at 8b, 9b. However, in the position depicted in FIG. 2b, the stopper member 13 has been moved to the left and its leg portion 13a is pressed against the brake ring 12. As a result of this, a frictional force is developed which restrains relative rotational movement between the operational member 8 and the intermediate barrel 9. With the elements of the lens assembly in this position, no restraint is applied to axial movement of the operational member 8 so that zooming operation will occur in the usual manner.

Furthermore, as a result of the click mechanism comprising the click ball 14a engaging within the click detent grooves 13b, it is possible to alter in a stepwise manner the force of the brake ring 12. That is, the rotative torque of the operational member for focusing purposes is made variable.

As a result of the construction of the present invention, it is possible to prevent accidental shifting of a sharp image focus resulting from unintentional rotation of the operational member 8 during zooming operation. Since the operational member 8 constitutes the single member for operating the zoom lens, this provides significant advantages.

It is noted that in the embodiment of FIGS. 2(a)-2(b), the elastic brake ring 12 is fitted in the circumferential groove 9c provided in the intermediate barrel 9 and is arranged to be pressed by the leg portion 13a of the stopper member 13 so as to ride upon the tapered surface 9c' of the circumferential groove 9c so that the elastic member 12 produces a wedge effect between the intermediate barrel 9 and the operational member 8 which maintains the barrel 9, the zoom barrel 10 and the operational member 8 fixedly secured relative to each other thus inhibiting relative rotation of the member 8 about the optical axis.

When the elastic member 12 is to be inserted into the circumferential groove 9c, the circumferential length of the elastic member 12 about the optical axis must be sufficiently long that axial alignment of the leg portion 13a relative to the elastic brake member 12 is secured in the entire range of rotation of the operational member 8 from the position for focusing at an object at infinity to the position of the closest focused object.

It should be noted that in the case of FIGS. 2(a) and 2(b), the elastic brake member 12 may be otherwise affixed to the leg portion 13a of the stopper member 13.

The material of the brake member 12 may be natural rubber or a synthetic resin material capable of sufficient elastic deformation so as to produce the aforementioned wedge or friction effect.

Figure 3A:
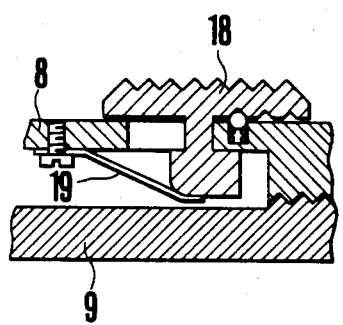
FIGS. 3(a) and (b) are views similar to the views of FIGS. 2(a) and (b) showing another example of the rotation inhibiting means of the present invention.
Figure 3B:
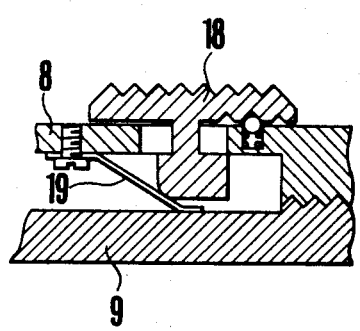

Another embodiment of the invention is depicted in the FIGS. 3(a) and 3(b) wherein similar reference numerals have been employed to denote parts similar to those shown in FIG. 2(a) and 2(b). In the embodiment of FIGS. 3(a), 3(b) a leaf spring 19 is connected at one end of the operational member 8 with the opposite end of the spring 19 being bent and inserted into a space beneath a stopper member 18.

When the stopper member 18 is in the position shown in FIG. 3(a), the leaf spring 19 does not function as a braking element thus permitting the operational member 8 to be rotated relative to the intermediate barrel 9.

When stopper member 18 is axially moved in the manner indicated in FIG. 3(b), a leg portion 18a of the stopper member 18 will press against the leaf spring 19 whereby the free end of the leaf spring 19 will be pressed against the intermediate barrel 9 and whereby the operational member 8 and the intermediate barrel 9 will be frictionally connected with each other to inhibit rotation of the member 8.

It should be appreciated that the present invention involves features whereby the single operational member 8 is fitted on a fixed barrel 1 through an intermediate member which comprises the barrel 9 and the zoom barrel 10, and that a mechanism 8b, 9b for relative rotation is provided between the operational member 8 and the intermediate member. Furthermore, there is provided means for inhibiting this relative rotation of the operational member 8 and the intermediate member.

Therefore, the present invention involves advantages in that after the zoom lens has been focused on a given object, when the stopper member 13, 18 is acted upon, the operational member 8 is restrained from rotation about the optical axis but remains operative for axial movement with variation of the focal length of the entire system. During zooming therefore there is no possibility of occurrence of an accidental shift of a sharp image plane.

Another advantage of the invention is that while manually controlling the pushing force applied on the stopper member 13, 18 the operator may utilize the lens in either an upwardly or downwardly pointed position without causing the optical system to be moved from the weight of its own elements. Thus, photographs having intended magnification of objects will result.

It should be noted that although the embodiments of the present invention have been described as applied to interchangeable camera lenses, the invention is also applicable to lens assemblies which are built into a camera body.

FIG. 4 shows an example of a modification of the zoom lens shown in FIG. 1. This zoom lens assembly has a fixed barrel 20 provided at one end with a helicoid 20c engaging with a focusing lens holder 21 for holding the focusing lens group L1. A single operational member 22 is operable for rotation about the optical axis and for linear movement along the optical axis.

The operational member 22 and the focusing lens holder 21 are provided with engaging means comprising a pin 21a and elongated slot 22a in a manner similar to that shown in the lens assembly of FIG. 1. The rotative operation of the operational member 22 controls axial movement of the lens group L1. An intermediate member 23 is arranged between the single operational member 22 and the fixed barrel 20. The intermediate member 23 is engaged with the operational member 22 in a screw-threaded connection by means of a screw thread having a fine pitch. When the operational member 22 is rotated, the intermediate member 23 is left on the barrel 20. When the operational member 22 is moved axially, it is moved in unison. Fixed to the intermediate member 23 is a lens holder 24 for holding the lens group L2 for zooming through an interconnection member 24a.

The interconnection member 24a extends through linear guide slots 20a and 20b in the barrel 20. L3 is the relay lens group connected through a holder cell with the fixed barrel 20.

A rotation preventing operation member 25 similar to that shown in the previous embodiments, is fitted on the operational member 22 and is provided with a leg portion 25a which penetrates a linear slot 22a' of the operational member 22 and extends into the interior of the barrel. Between the rotation preventing member 25 and the single operational member 22 there is provided a click mechanism comprising balls, a spring and a recess similar to that previously described. An elastic member 26 for inhibiting rotation of the single operational member relative to the intermediate member 23 due to a screw-threaded engagement portion 23a is also provided. The elastic member 26 is constructed in a form similar to that shown in FIGS. 2(a), 2(b).

In the embodiment of the lens assembly of FIG. 4, upon operation of the rotation preventing operation member 25, rotation of the focusing lens holder 21 may be inhibited in a manner similar to that previously described in connection with the other embodiments.

While specific embodiments of the inventions have been shown and described in detail to illustrate the applications of the inventive principles, it will be understood that the inventions may be embodied otherwise without departing from such principles.

What is claimed is:

1. A lens assembly having a single operational member rendered operative in two directions with respect to an optical axis to perform distance adjustment for focusing and zooming, comprising:
    (a) focusing means of said lens assembly and a lens holding member holding a focusing optical lens, said focusing means controlling the axial movement of said lens holding member for focusing said focusing optical lens in response to rotation of said single operational member about said optical axis;
    (b) zooming mechanical means responsive to zooming operation for performing a magnification varying function and an image shift compensating function simultaneously and arranged to avoid movement of said focusing lens group when said zooming operation is performed; and
    (c) means for prohibiting said single operational member from effecting focusing actuation while allowing it to perform zooming actuation.

2. A zoom lens mounting mechanism for a lens assembly defining an optical axis including a single operational member and means for inhibiting said single operational member from performing focusing operation comprising:
    (a) means operatively associated with said single operational member enabling it to effect focusing operation when it is rotated about said optical axis of said lens assembly, and to carry out zooming operation when it is moved along said optical axis;
    (b) a lens mounting member holding lens groups movable for zooming operation with variation of image magnification while the image shift is compensated;
    (c) a cylindrical member in which said lens mounting member is fitted;
    (d) a focusing lens mounting member for holding a lens movable for focusing, said focusing lens mounting member being shifted in the axial direction in response to rotation of said single operational member; and
    (e) means for preventing rotation of said single operational member.

3. A zoom lens assembly having a single operational member capable upon rotation thereof about an optical axis of said lens assembly to effect focusing of said assembly and upon axial movement thereof to effect zooming operation of said assembly, comprising:
    (a) first and second lens mounting members for holding first and second lens groups movable for zooming operation with variation of image magnification while the image shift is compensated respectively;
    (b) a cylindrical member in which said first and said second lens mounting members are fitted;
    (c) a third lens mounting member for holding a third lens movable for focusing;
    (d) first guide means responsive to said operational member for axially moving said third lens mounting member to effect focusing;
    (e) an intermediate member between said single operational member and said cylindrical member arranged to move in the same direction as said operational member simultaneously therewith upon axial movement of said operational member, said intermediate member being provided with second guide means for moving said first and said second lens mounting members responsive to axial movement of said operational member;

(f) connecting means connecting said operational member with said intermediate member, said connecting means allowing said operational member to rotate relative to said intermediate member and permitting axial movement of said operational member and said intermediate member in unison with each other; and (g) means for preventing rotation of said single operational member, said rotation preventing means having a member for preventing rotation of said single operational member between said single operational member and said intermediate member.

4. A zoom lens assembly according to claim 2, further comprising a rotation preventing member for preventing rotation of said means for preventing rotation of said operational member.

5. A zoom lens assembly according to claim 3 or 4, further comprising rotation preventing operation means disposed on said single operational member and operating in such a manner that when moved to a direction along the optical axis, said single operational member is prohibited from effecting focusing operation.

6. A zoom lens assembly according to claim 5, wherein said preventing member is a member responsive to said moving operation of said rotation preventing operation means for exerting a reactive force to prohibit rotation of said operational member about the optical axis.

7. A zoom lens assembly according to claim 6, wherein said preventing member is one of a member made of rubber material and a spring member.

8. A zoom lens assembly according to claim 6, further comprising means for holding said rotation preventing operation means in one of an active state and a nonactive state.

9. A zoom lens assembly according to claim 7, wherein said preventing member consists of a resilient member fitted in a groove formed on said intermediate member, and arranged to be engageable with said rotation preventing operation means held on said single operational member whereby said single operational member and said intermediate member are brought into frictional engagement with each other by said rotation preventing operation means.

* * * * *